Nov. 20, 1951     J. YOUHOUSE     2,575,903
POWER TOOL CHUCK
Filed Jan. 25, 1949
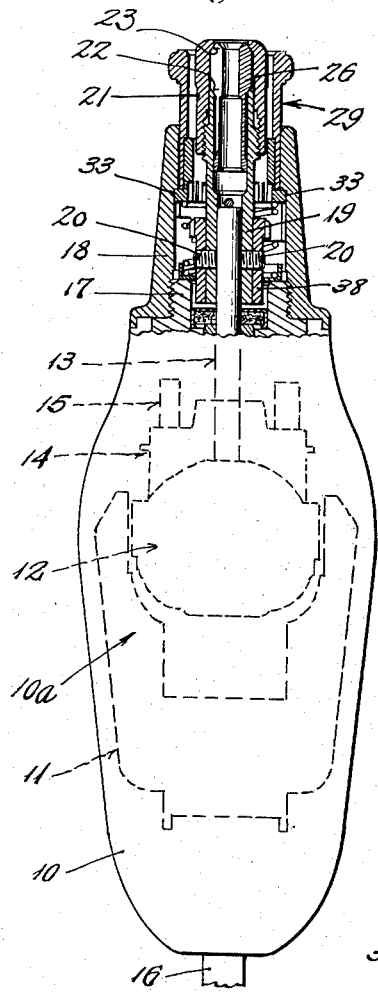
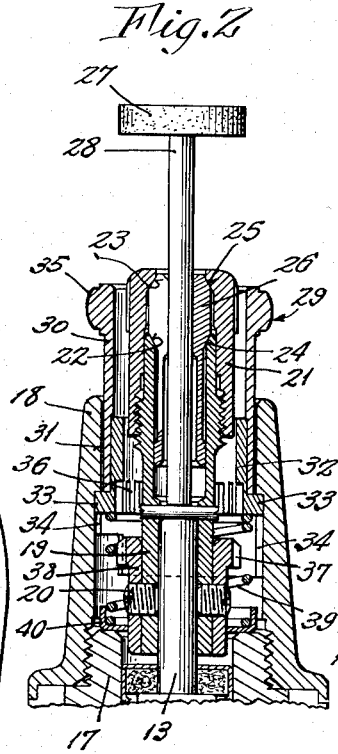
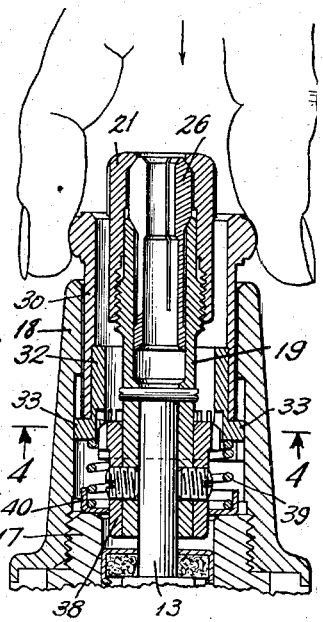
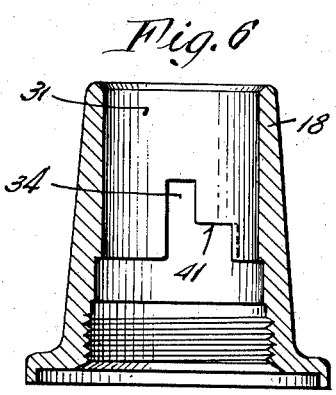
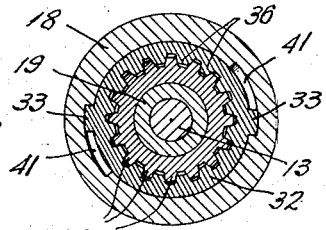
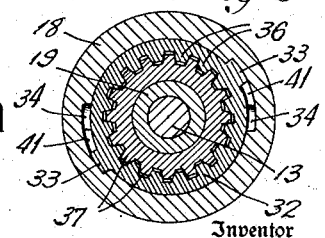
Joseph Youhouse, Inventor
By Johnson and Kline, Attorneys Patented Nov. 20, 1951

2,575,903

UNITED STATES PATENT OFFICE 2,575,903

POWER TOOL CHUCK

Joseph Youhouse, Fairfield, Conn., assignor to Casco Products Corporation, Bridgeport, Conn., a corporation of Connecticut Application January 25, 1949, Serial No. 72,610

8 Claims. (Cl. 279—52)

This invention relates to power-tool chucks, and more particularly to chucks for use with portable power tools to be held in the hand.

The present invention is concerned with improvements in the chuck constructions shown in Patents 2,341,529 issued to J. H. Cohen on February 15, 1944, and 2,436,540 issued to William F. Allenby on February 24, 1948.

The hand tools shown in these patents are especially adapted for model maker's and hobbyist's use, and comprise small electric motors and chucks rotated thereby, mounted in small casings adapted to be held in one hand in the manner of a pencil. In these prior tools the chucks had essentially two main, relatively movable portions so arranged that relative movement operated the chuck to tighten or loosen it. Prior to the chuck being operated, a collar which surrounded the chuck was shifted axially inward and given a slight turn whereby it became locked in its inner position; cooperable teeth provided on the collar and one chuck portion held said portion against turning, and by this organization the operation of turning the other chuck portion to loosen or tighten the chuck was greatly facilitated. The locking collar when locked in its inward position was prevented from turning in each direction, and positively held the one chuck portion locked against turning in either direction, and also the motor shaft which carried the said chuck portion.

With this prior construction if a user were to inadvertently turn on the swtich of the motor before releasing the locking collar, the motor would remain stalled and would draw a relatively heavy current which could damage it, and could constitute a fire hazard if no circuit-breaking safety means were provided.

The above-stated objection to these prior constructions is overcome by the present invention.

An object of the invention is to provide an improved hand power tool and chuck having manually operable locking means for holding one chuck portion and the motor and shaft secured thereto against turning while another chuck portion is turned to operate the chuck, wherein no damage will be caused to the motor or other parts but instead the motor will automatically be normally operative if the locking means is forgotten and not manually released and the motor is turned on.

I accomplish this object broadly by utilizing the power or torque produced by the motor to automatically release the locking means, and thus enable the motor shaft and chuck to rotate at their normal speed.

Another object of the invention is to provide an improved automatically-releasing, locking chuck construction in a hand tool as characterized above, which is extremely simple and reliable in operation, and is economical to fabricate.

Still another object of the invention is to provide an improved locking chuck construction as set forth above, which is so arranged that the operation of manually locking the chuck involves the same simple and convenient procedure as that employed in the devices of the above-referred to patents, i. e. the procedure of merely sliding a collar (which encircles the chuck) axially inward and giving it a slight turn to maintain it in its inward position or station.

In the prior devices above referred to, the locking collar has a pair of lugs or splines which extend in grooves or keyways in the interior of the tool casing, thereby keying the collar against free turning in the casing but enabling the collar to be axially shifted inward or outward. These prior devices employed a bayonet slot construction whereby the lugs or splines of the locking sleeve could be disposed in the locking portion of the slot, thus preventing the collar when in inward locking position from turning in either direction, and thus securely locking the motor shaft against turning in either direction regardless of torque of said shaft. By the present invention, the shape of the locking slot for the splines of the locking collar is arranged to eliminate an undercut which in the prior devices mentioned formed the hook portion of the slot, and thus while the collar is prevented from being automatically turned in one direction and unlocking the shaft, it may in a simple manner and by simple means be readily automatically turned a slight extent in the other direction to a position where a charged spring will automatically project the collar and unlock the shaft. I have found that turning of the collar may be readily effected by the power supplied by the shaft of the motor, and therefore I utilize this power, which turns the motor shaft in a work-performing direction, to automatically turn the locking collar in the said other direction to release the motor shaft for normal rotation, all this being accomplished without requiring any additional parts or further complications of structure over that of the prior devices mentioned.

By this arrangement the locking slot which is cooperable with the splines of the locking collar, acts in a manner that the collar will not be automatically released when turning force is applied to the chuck portion and shaft in tightening the chuck. Where a reverse turning force is to be applied to loosen the chuck, it is merely necessary for the user to hold the locking collar inward against the pressure of the charged spring, this being easily done, whereupon the locking of the motor shaft and associated chuck portion will remain effective, and the manually operable chuck portion or nut may then be rotated to release the chuck.

Other features and advantages will hereinafter appear.

In the accompanying drawings:

Figure 1 is a view partly in elevation and partly in axial section, of the improved tool and chuck of the present invention.

Fig. 2 is a detail in section, enlarged, of the chuck and locking structure, showing the locking collar in released position and showing the chuck supporting a tool bit.

Fig. 3 is a view like Fig. 2 but showing the locking collar of the chuck moved to, and manually held in, its inward locking position or station.

Fig. 4 is a transverse sectional view taken on line 4—4 of Fig. 3.

Fig. 5 is a view like Fig. 4, but showing the locking collar turned a small extent to retain it in its inward locking position, and Fig. 6 is an axial sectional view of the neck portion or ferrule of the tool casing, showing the locking slot construction.

Referring to Fig. 1 the improved tool chuck of the present invention is shown in connection with a small, hand-held grinding tool such as is used in connection with model work, die work etc. This power hand grinder comprises a casing 10 having within it an electric motor 10a (designated in dotted outline) which includes a field 11, armature 12 carried on a shaft 13, and commutator 14 engaged by brushes 15, the motor 10a being connected to an electric cord 16 for energization.

The casing 10 includes an externally threaded tubular part 17 through which the shaft 13 extends, the tubular part 17 having threaded thereon a ferrule 18 surrounding the shaft 13 and functioning as a finger grip for the tool.

The hand tool shown is adapted to be held in the hand in the manner of a pencil, whereby the ferrule 18 is engaged by the first three fingers of the hand and the body or casing 10 extends angularly backward from between the thumb and forefinger.

Referring to Figs. 1, 2 and 3, the powered shaft 13 carries a sleeve 19 which is secured to the shaft by means of set screws 20, the said sleeve adjacent its upper end being externally threaded and carrying a nut 21. The sleeve 19 and nut 21 have internal beveled portions or shoulders 22 and 23 respectively, adapted to cooperate with beveled shoulders 24 and 25 respectively of a split collet 26 extending into and carried by the sleeve 19 whereby tightening of the nut 21 reduces the bore diameter of the collet, and loosening of the nut 21 increases the bore diameter.

The sleeve 19, nut 21 and collet 26 constitute a chuck whereby various tool bits may be mounted for rotation. For example, in Fig. 2 a tool bit consisting of an abrasive wheel 27 carried by a shank 28 is mounted in the collet 26, the shank 28 extending through the bore of the collet and being gripped by the collet jaws upon the nut 21 being tightened with respect to the chuck sleeve 19.

In accordance with the present invention improved means other than a circuit control is provided to enable tightening and loosening of the chuck nut 21 to be quickly and conveniently accomplished to operate the chuck by effecting a locking of the chuck sleeve 19 to the casing 10, and whereby if such locking should be inadvertently forgotten and allowed to remain effective and thereafter the power supply connected to the motor 10a of the tool, the motor shaft 13 would not remain stalled nor the locking of the chuck sleeve 19 remain effective. Instead, the application of energy of the motor 10a, as effected by closing the control switch (not shown) for the motor, will in accordance with the present invention result in the motor power causing rotation of the shaft 13 and causing automatic actuation of the locking means for the sleeve 19 whereby the sleeve is set free, and together with the motor shaft 13, chuck and tool 27, allowed to rotate. Thus there is obviated any likelihood of damage to the motor, or of fire hazard, if the locking means for the chuck should be inadvertently allowed to remain effective and the motor thereafter energized.

The improved automatic release means provided by the invention in connection with the locking of one chuck part to enable the chuck to be quickly and conveniently operated, includes an axially movable collar surrounding the chuck and adapted to function both as a finger grip for the tool and as a shield or guard for the rotating chuck. Referring to the figures, this collar is indicated at 29 and comprises a two-part tubular structure including an upper tubular member 30 slidably carried in the bore 31 of the ferrule 18, and a lower tubular member 32 pressfitted in and rigid with the member 30 and having lugs 33 located diametrically opposite each other, projecting radially outward and into slots 34 extending longitudinally in the bore 31 of the ferrule 18. As shown in Figs. 1 and 2, the slots 34 terminate short of the upper extremity of the ferrule 18 whereby stops are provided, limiting the upward or outward movement of the collar 29 to the position or station shown in these figures.

At its upper extremity the part 30 of the collar 29 has a knurled annular bead 35, providing for a convenient finger grip.

By the above construction the collar 29 is axially shiftable in the ferrule 18 between an extended position or station shown in Figs. 1 and 2 and a retracted position or station shown in Fig. 3 wherein it exposes the chuck nut 21 to enable the latter to be gripped and tightened or loosened; however, the collar 29 is at all times prevented from revolving due to the engagement of the keys or splines 33 in the slots 34 of the ferrule 18.

For the purpose of locking the shaft 13 and chuck sleeve 19 against rotation when the collar 29 is held in its retracted position or station as shown in Fig. 3, the lower tubular part 32 of the collar is provided with internal teeth 36 extending around its periphery at the mouth, said teeth being cooperable and interlockingly engageable with external teeth 37 on a clutch part or collar 38 carried on the lower portion of the chuck sleeve 19 and secured against rotation by the set screws 20. Interlocking engagement of the cooperable teeth 36 and 37 shown in Figs. 3, 4 and 5, locks the shaft 13 and chuck sleeve 19 to the collar 29 and consequently to the ferrule 18 and casing 10, thus enabling the chuck nut 21 to be readily loosened or tightened to operate the chuck. When the collar 29 is in its extended position as shown in Figs. 1 and 2, the cooperable clutch teeth 36 and 37 are disengaged and the shaft 13 and chuck sleeve 19, together with the chuck and tool carried thereby, are free to rotate.

For the purpose of continuously urging the collar 29 to its extended position, a helical compression spring 39 is provided, engaging the lower face of the collar part 32 and engaging a cupped washer 40 which in turn engages the upper face of the tubular casing part 17.

By the present invention detent means are provided for maintaining the collar 29 in its retracted chuck-locking position shown in Fig. 3, said means being rendered automatically inoperative to lock the chuck and associated parts upon application of power to the motor of the tool and consequent turning of the motor shaft 13.

Referring to Figs. 4, 5 and 6, the ferrule 18 is provided with oppositely disposed internal shoulders 41 (one of which is shown in Fig. 6) extending circumferentially of the bore 31 of the ferrule and meeting with the edges or walls of the grooves 34 thereof. When, as shown in Figs. 3 and 4, the locking collar 29 is held in its inner or retracted position, it may be turned clockwise as viewed from the tool end of the power tool (or counterclockwise as viewed in Fig. 4), whereupon the lugs or keys 33 of the collar 29 will be shifted into engagement with the shoulders 41 of the ferrule 18. This will prevent the compression spring 39 from automatically projecting the collar 29 to its extended position when manual pressure is taken off the collar. When the collar 29 is thus maintained in its retracted locked position, the nut 21 is exposed and may be readily tightened, either by hand or by a suitable tool, to decrease the bore of the collet 26 and cause the latter to securely grip the shank 28 of the abrasive wheel 27. Thus, the insertion of a tool in the chuck may be quickly and conveniently accomplished, since with the chuck released it is merely necessary to retract and lock the collar 29, insert the tool bit shank in the chuck and tighten the chuck nut 21 while holding the casing 10 stationary.

After this has been done, the collar 29 may be turned by the operator counterclockwise as viewed from the tool end of the device, whereupon the spring 39 will shift the collar to its extended position, unlocking the motor shaft and rendering the tool in condition for operation. Energization of the motor of the tool will then operate the chuck and tool bit carried thereby for performing work.

If, however, after tightening of the chuck nut 21, the operator forgets to again shift the collar 29 to its extended releasing position, and instead should energize the tool motor, the motor will not be damaged nor will any fire hazard be created, but instead the tool will automatically become unlocked and operate in its normal manner. This will take place in the following manner: Energization of the motor 10a will cause a torque to be applied to the shaft 13 tending to rotate the shaft in a counterclockwise direction as viewed from the chuck end of the tool. Turning force will be applied to the clutch part 38, and since the teeth 37 thereof interlock with the teeth 36 of the collar 29, the said turning force will be imparted to the collar and will turn the latter counterclockwise as viewed from the top or chuck end of the tool, causing the lugs 33 to become disengaged from the shoulders 41 in the ferrule 18 and to occupy the grooves 34 in the ferrule. The compression spring 39 will then automatically become operative to shift the locking collar 29 to its extended position whereupon it will unlock the shaft 13 and chuck sleeve 19, enabling these parts to rotate in their normal manner in response to energization of the motor.

For the operation of loosening the chuck nut 21 to remove a tool bit from the chuck, it is merely necessary to manually hold the locking collar 29 in its retracted position as shown in Fig. 3, and while the collar is kept in said position by pressure of the fingers, apply a turning force to the nut 21 to unscrew the same. During such application of force to the nut 21, the shaft 13 and chuck sleeve 19 will be prevented from turning since they are locked to the casing 10 which is normally held stationary in the hand, by engagement between the cooperable teeth 36 and 37 of the clutch parts 32 and 38.

It will be seen that by the present invention I have provided an extremely simple and advantageous safety device which prevents damage to the motor of the tool or prevents likelihood of fire hazard, if the motor is inadvertently energized by an operator prior to the operator unlocking the chuck part by releasing the locking collar.

Variations and modifications may be within the scope of this invention and portions of the improvements may be used without others.

I claim:

1. In a power-operated tool, a casing; a motor in the casing, having a shaft to which it imparts power; a collet; an externally threaded sleeve secured to the shaft to turn therewith, said sleeve carrying said collet; a nut threaded on the sleeve, said nut, sleeve and collet having cooperable means whereby tightening of the nut tightens the collet, and loosening of the nut loosens the collet; a collar surrounding the nut; means mounting the collar for limited axial movement on the casing between extended and retracted positions; means restraining turning of the collar on the casing; means locking the sleeve and shaft against turning with respect to the collar when the latter is in retracted position; yieldable means operable to axially move said collar to extended position, said collar when extended substantially enclosing said nut and being constructed to constitute a finger grip; and automatically releasable mechanism for maintaining the collar in retracted position against the action of said yieldable means, said mechanism responding to turning of the shaft and sleeve solely in one direction under the power supplied by the motor, to release said collar for axial extending movement whereby the yieldable means extends the collar, thus releasing the shaft and sleeve for free turning.

2. In a power-operated tool, a casing having a bore; a motor in the casing, having a shaft to which it imparts power, extending through said bore; a collet; an externally threaded sleeve secured to the shaft to turn therewith, said sleeve carrying said collet; a nut threaded on the sleeve, said nut, sleeve and collet having cooperable means whereby tightening of the nut tightens the collet, and loosening of the nut loosens the collet; a collar surrounding the nut; means mounting the collar for limited axial movement in the bore of the casing between extended and retracted positions; means restraining turning of the collar on the casing; means locking the sleeve and shaft against turning with respect to the collar when the latter is in retracted position; yieldable means operable to axially move said collar to extended position, said collar when extended substantially enclosing said nut and being constructed to constitute a finger grip; and automatically releasable mechanism comprising a projection on the exterior of the collar and a substantially straight shoulder extending in a circumferential direction in the bore of the casing, engageable with the projection for maintaining the collar in retracted position against the action of said yieldable means, said mechanism responding to turning of the shaft and sleeve solely in one direction under the power supplied by the motor, to release said collar for axial extending movement by the yieldable means, thus releasing the shaft and sleeve for free turning.

3. In a power-operated tool, a casing having a bore; a motor in the casing, having a shaft to which it imparts power, extending through said bore; a collet; an externally threaded sleeve secured to the shaft to turn therewith, said sleeve carrying said collet; a nut threaded on the sleeve, said nut, sleeve and collet having cooperable means whereby tightening of the nut tightens the collet, and loosening of the nut loosens the collet; a collar surrounding the nut; means mounting the collar for limited axial movement in the bore of the casing between extended and retracted positions; means restraining turning of the collar on the casing, comprising a projection on the collar and a longitudinally extending groove in the bore of the casing; means locking the sleeve and shaft against turning with respect to the collar when the latter is in retracted position; yieldable means operable to axially move said collar to extended position, said collar when extended substantially enclosing said nut and being constructed to constitute a finger grip; and automatically releasable mechanism comprising said projection on the exterior of the collar and a substantially straight shoulder extending in a circumferential direction in the bore of the casing, engageable with the projection for maintaining the collar in retracted position against the action of said yieldable means, said mechanism responding to turning of the shaft and sleeve solely in one direction under the power supplied by the motor, to release said collar for axial extending movement by the yieldable means thus releasing the shaft and sleeve for free turning.

4. In a power-operated tool, a casing having a power shaft rotatable therein; chuck means carried by the shaft, having one part secured to and turnable with the shaft and another part exposed for manipulation and turnable with respect to said one part to tighten or loosen the chuck means; means including a manually operable member movable in a predetermined path to and from a given position for locking said one part and shaft to the casing against turning in one direction when the member is out of said given position, thereby to enable the exposed part of the chuck means to be forcibly turned in the said direction with respect to the said one chuck part to operate the chuck means; a spring operable to return the manually operable member to said given position; and automatically releasable means for holding the member out of said given position against the action of the spring, said means being released in response to turning of the shaft under its power in the other direction whereby the spring automatically returns the member to said position, unlocking the shaft.

5. In a power-operated tool, a casing having a power shaft rotatable therein; chuck means carried by the shaft, having one part secured to and turnable with the shaft and another part exposed for manipulation and turnable with respect to said one part to tighten or loosen the chuck means; means including a manually operable member movable in a predetermined path to and from a given position for positively locking said one part and shaft to the casing against turning in either direction when the member is out of said given position, thereby to enable the exposed part of the chuck means to be forcibly turned with respect to the said one chuck part to operate the chuck means; a spring operable to return the manually operable member to said given position; and automatically releasable means for holding the member out of said given position against the action of the spring, said means being released in response to turning of the shaft under its power in the other direction whereby the spring automatically returns the member to said position, unlocking the shaft.

6. In a power-operated tool, a casing having a power shaft rotatable therein; a chuck carried by the shaft, having one part secured to and turnable with the shaft and a manually operable part turnable relative to the one part to tighten or loosen the chuck; means including a manually operable collar surrounding the shaft and axially movable on the casing between locking and releasing axial positions, for locking said one part and shaft to the casing against revolving in either direction when the collar is held in one axial position, thereby to enable the other chuck part to be turned to operate the chuck; spring means operable to shift the collar to its releasing axial position; and automatically releasable detent means made operable by turning the collar in one direction when in locking axial position, for holding the collar in said position against said spring means, said detent means being released in response to opposite turning of the collar caused by turning of the shaft and one chuck portion in the other direction whereby the collar is released for movement to its releasing axial position under the action of said spring means, thereby to enable the shaft to turn under its power, for performing work.

7. In a power-operated tool, a casing having a power shaft rotatable therein; a chuck carried by the shaft, having one part secured to and turnable with the shaft and a manually operable part turnable relative to the one part to tighten or loosen the chuck; and manually operabe automatically releasable means for positively locking said one part and shaft to the casing against turning in either direction, thereby to enable the manually operable chuck part to be forcibly moved to operate the chuck, said means automatically releasing the one chuck part and shaft from the casing in response to turning of the shaft solely in one direction under the power supplied to it.

8. In a power-operated tool, a casing; a motor in the casing, having a shaft to which it imparts power; a chuck carried by the shaft, having one part secured to and turnable with the shaft and a manually operable part turnable relative to the one part to tighten or loosen the chuck; and manually operable automatically releasable means including a collar extending around the chuck, including means restraining turning of the collar on the casing and enabling limited axial movement thereof, and including cooperable clutch teeth located on the collar and one chuck part and engaging each other when the collar is in one predetermined axial position, for positively locking said one part and shaft to the casing against turning in either direction, thereby to enable the manually operable chuck part to be forcibly moved to operate the chuck, said means automatically releasing the one chuck part and shaft from the casing in response to turning of the shaft solely in one direction under the power supplied by the motor.

JOSEPH YOUHOUSE.

REFERENCES CITED

The following references are of record in the file of this patent:

UNITED STATES PATENTS

| Number | Name | Date |
| --- | --- | --- |
| 2,153,847 | Scruggs | Apr. 11, 1939 |
| 2,341,529 | Cohen | Feb. 15, 1944 |